Nov. 21, 1939.   J. L. SCHLITT   2,180,435
METHOD OF SEPARATING THE CONSTITUENTS OF GASEOUS MIXTURES
Filed Dec. 30, 1938
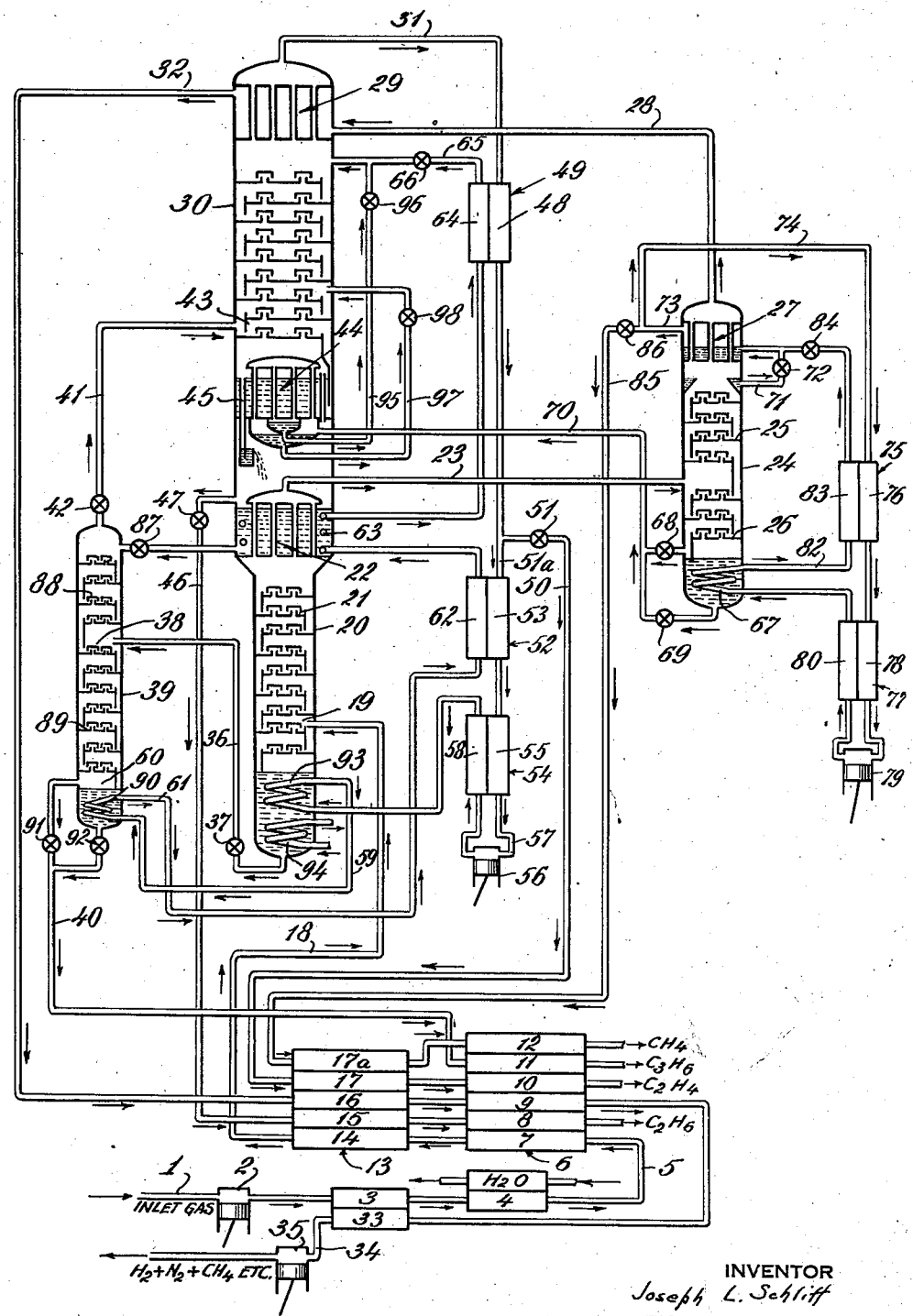
INVENTOR
Joseph L. Schlitt
BY
Pennie Davis Marvin & Edmonds
ATTORNEYS Patented Nov. 21, 1939

2,180,435

UNITED STATES PATENT OFFICE 2,180,435

METHOD OF SEPARATING THE CONSTITUENTS OF GASEOUS MIXTURES

Joseph L. Schlitt, Darien, Conn., assignor to Air Reduction Company, Incorporated, New York, N. Y., a corporation of New York Application December 30, 1938, Serial No. 248,379

14 Claims. (Cl. 62—175.5)

This invention relates to a method of separating from various gaseous hydrocarbon mixtures one or more constituents in an industrially pure condition.

Gaseous mixtures to which the method may be applied are exemplified by the gases resulting from the "cracking" of petroleum waste products, for example, the constituents of petroleum whose boiling points are too low for utilization of these gases as constituents of the fuel employed for gasoline engines. Also, the more condensable and, therefore, the less valuable portions of raw petroleum are subjected to a "cracking" operation whereby hydrocarbons of high molecular weight, both saturated and unsaturated, are decomposed into hydrocarbons of low molecular weight, and the gaseous mixture resulting may be subjected advantageously to the operation hereinafter described.

Of those constituents of gaseous mixtures resulting from cracking operations, two of the most important are ethylene and propylene on account of their chemical properties. Both of these gases find wide application in various industries, for example, in the manufacture of alcohols and other solvents, in the artificial textile industry, in the manufacture of various synthetic resins and in the manufacture of glycols which, when mixed with water, form an ideal anti-freeze. Both ethylene and propylene are becoming increasingly important in the field of synthetic organic chemistry.

The gaseous mixtures to which the method is especially directed usually contain, in addition to the hydrocarbons already mentioned, substantial percentages of hydrogen, and may also contain nitrogen, carbon monoxide, etc.; also various higher hydrocarbons, such as butane, butylene and benzene. In many cases, a certain amount of acetylene is also present.

The object of the method herein described is to separate in industrially pure condition from a complex gaseous mixture substantially all of the contained ethylene.

Another object of the invention is to recover the propylene substantially free of any lower boiling constituents.

Other less important constituents of hydrocarbon gas mixtures may also be recovered in substantial purity, such as methane and ethane.

Other objects and advantages of the invention will be apparent upon consideration of the following specification and accompanying drawing, in which the figure is a schematic illustration of apparatus adapted for the practice of the invention which, however, gives no information as to actual relative sizes of various portions of the apparatus, and is not intended to be employed in any manner as a working model.

The essential difficulty in the development of a method suitable for separation of constituents such as ethylene and propylene from complex gaseous mixtures may be realized more fully if we recall that several hydrocarbons occurring in the mixtures have boiling points intermediate the boiling points of ethylene (−103.7) and propylene (−47.7). For example, ethane boils at −89.1, and this hydrocarbon is an important constituent of the gaseous mixtures. Acetylene sublimes at −83.6 under one atmosphere of pressure, while carbon dioxide, also a common constituent of the mixtures under discussion, sublimes at −78.4 under one atmosphere of pressure. Furthermore, the presence of hydrogen and other constituents liquefying at low temperatures in the cracked gas makes the separation of the methane from the ethylene more difficult to accomplish. The temperatures mentioned are in degrees centigrade throughout this specification.

The method as a whole consists of correlated steps of distillation, rectification, selective liquefaction, reciprocal evaporation and condensation, dephlegmation, etc.; and the invention depends upon the way in which these various well known steps are intercorrelated. As the result of long continued experimentation, the applicant has been able to obtain a method which is economical in operation and efficient in the economy of power and cost of apparatus necessary for operation.

Referring to the drawing, the incoming mixture to be separated enters the system through pipe 1 leading directly to the main compressor 2, where it is compressed to the desired pressure and passes thence to an exchanger 3, wherein it warms by thermal contact a product fluid coming from the apparatus. Thence the compressed gas mixture passes to a water cooler 4, wherein its temperature is reduced to substantially atmospheric. By means of a pipe 5 it passes to compartment 7 of exchanger system 6, coming into thermal contact with various outflowing gases, as later described. Thence it is conducted directly into compartment 14 of exchanger system 13. It is cooled still further therein by gases hereinafter described. By means of pipe 18 it is thence conducted to an intermediate level 19 of the high pressure rectifier 20 containing trays 21 and also a backward return tubular condenser 22 at the top thereof and evaporating coils 93 and 94 at the bottom.

The incoming fluid as it enters level 19 of rectifier 20 may be, and usually is, partly in the condensed state. In rectifier 20 the liquid portion cascades downward over the usual trays or baffles, while the vapor portion ascends to the top of rectifier 20 and thence into the tubular condenser vaporizer 22, composed of parallel vertical tubes, wherein the uncondensed vapors entering at the bottom are partially and selectively liquefied. The uncondensed residue of this selective liquefaction is now free from propylene and higher boiling constituents and contains substantially all of the hydrogen and methane, most of the ethylene and a portion of the ethane. This residue passes through pipe 23 to an intermediate level of auxiliary rectifier 24 containing trays 25 and 26.

The rectifier 24 contains at the top a tubular condenser or dephlegmator 27, wherein the ascending vapors in rectifier 24 are partially and selectively liquefied. The uncondensed residue of this selective liquefaction is conducted upward through pipe 28 around the tubes of a condenser or dephlegmator 29 at the top of the main rectifier 30, the upper end product of which is substantially pure ethylene leaving rectifier 30 by means of pipe 31. The warmed vapors leave dephlegmator 29 by means of pipe 32, which conducts them directly to compartment 16 of exchanger system 13 and thence immediately to compartment 9 of exchanger system 6 and thence directly to compartment 33 of the exchanger 3, wherein they are heated by the hot compressed gases leaving compressor 2 and are thence conducted through pipe 34 to expansion engine 35, wherein they are expanded with external work, and their pressure is reduced to that of atmospheric, and their temperature is lowered substantially to that of the surrounding atmosphere. These vapors, consisting, for example, of hydrogen, nitrogen, methane, etc., may be discharged to the atmosphere.

Returning to level 19 of rectifier 20 we shall consider the disposal of the liquid portion of the fluid entering rectifier 20 through pipe 18. This liquid collects in a pool surrounding the evaporating coils 93 and 94 already described, wherein a portion of it is evaporated and forms the ascending vapor necessary in the lower part of rectifier 20. The unvaporized residue leaves rectifier 20 through a pipe 36 and valve 37. This liquid residue contains substantially all of the propylene contained in the original gas mixture, and is delivered to an intermediate level 38 of rectifier 39. Reflux for column 39, consisting chiefly of ethane, is supplied from the base of column 30 through valve 87, and after cascading over trays 88 joins the liquid delivered to the column at the level 38. The combined liquids then cascade downwardly over trays 89 to the compartment 60 at the base of the column 39, wherein a portion of the liquid is evaporated by means of fluid circulating in the coil 90. A portion of the gas thus formed ascends the trays of column 39, and, after being rectified by the liquids descending therein, escapes as a mixture of ethylene and ethane through valve 42 and pipe 41 and enters column 30 at the intermediate level 43. The remainder of the gas formed by evaporating liquid in the pool 60 leaves column 39 through valve 91 and pipe 40. A part of the lower end product from column 39 may leave in the liquid state through valve 92, joining the vapor through valve 91 in pipe 40. This product contains substantially all of the propylene and constituents of higher boiling point in the original gas mixture and after passing through compartment 11 of exchanger 6 is led to suitable storage for use, or it may be subjected to further rectification by any well known means to free it from higher boiling constituents, such as propane, butane, etc.

The various liquids fed into rectifier 30, some of which have not yet been described, collectively drain to the bottom liquid pool surrounding the tubes of tubular vaporizer 44, and a portion of these liquids are evaporated thereby, and the resulting vapor constitutes the upwardly ascending vapor necessary in rectifier 30 below the intermediate level of admission 43. The remainder of this liquid passes down through an overflow pipe 45 and collects as the liquid pool surrounding the vertical tubes of condenser vaporizer 22. This liquid is chiefly ethane. By the action of the tubes of 22 and coil 63, the larger portion of this liquid is evaporated. A portion of the vapor is conducted outward through pipe 46 and valve 47 directly to compartment 15 of exchanger system 13 and thence immediately to compartment 8 of exchanger system 6 and thence to a convenient container or holder, thus constituting the ethane product of the separation.

The remainder of the vapor from the liquid surrounding tubes 22 passes upwardly and mixes with the vapors produced in vaporizer 44 and finally with the vapor introduced at 43, the combination constituting the ascending vapor necessary in main rectifier 30. A portion of the upper end product of this rectifier is, as already stated, the ethylene product of the rectification. Not all of the effluent vapors passing through pipe 31 are utilized as ethylene product, however. After passing through compartment 48 of the exchanger 49, this ethylene effluent is divided into two portions, one part of which passes through pipe 50 and valve 51 directly to compartment 17 of exchanger system 13, thence to compartment 10 of exchanger system 6, and thence to a suitable holder or container as the ethylene product of the whole process.

The remainder of the effluent leaving rectifier 30 through pipe 31 is employed, after warming up and recompressing, then cooling down and liquefying, as reflux liquid ethylene for refluxing the upper levels of the rectifier 30 in accordance with the well known procedure called autorectification. The portion of the ethylene effluent used for this purpose passes through pipe 51a, thence to compartment 53 of exchanger 52, thence to compartment 55 of exchanger 54, wherein its temperature is raised to that of the surrounding atmosphere. From exchanger 54 it is conducted directly to compressor 56, wherein its pressure is raised sufficiently for it to be liquefied by means of thermal contact with the liquids draining to the bottom of the rectifiers 20 and 39. If necessary, the pressure of the ethylene in this cycle may be raised by compressor 56 to a pressure higher than that necessary for condensation in the coils 90 and 93 in order to assist in maintaining the refrigerative effect in the system. After compression, the ethylene leaves compressor 56 by means of pipe 57 and enters compartment 58 of exchanger 54 and thence by continuation of pipe 57 directly to the evaporating coil 93, already described, thence through pipe 59 to evaporating coil 90 at the base of rectifier 39. By reason of the cold derived from these two liquid pools this compressed ethylene at or near the liquefaction point leaves evaporating coil 90 by means of pipe 61 to compartment 62 of exchanger 52, thence through liquefying coil 63 immersed in the liquid pool draining to the bottom of the upper portion of the main rectifier 30. This fluid, now in the liquid state, passes through compartment 64 of exchanger 49, where it is subcooled and, after passing through pipe 65 and valve 66, constitutes a portion of the reflux liquid ethylene for rectifier 30. An additional evaporating coil 94 is placed below coil 93 in the pool at the base of rectifier 20 to supply additional boiling if desired. In case it is necessary to operate coil 94, the relatively low grade refrigeration transferred from liquid at the base of column 20 to the fluid in coil 94 may be utilized in any well known manner, for example, to precool the methane cycle or to assist in the partial removal of high boiling constituents from the feed gas before it enters exchanger 6. Utilization of this refrigeration is omitted from the drawing to avoid unnecessary complication.

Next, with reference to the operation of rectifier 24 which, as already stated, receives as mixture to be separated the mixed uncondensed residue leaving vaporizer 22 by means of pipe 23. This mixture in the gaseous state enters at an intermediate level of rectifier 24 containing trays 25 and 26. An evaporating coil 67 is located at the bottom of rectifier 24 and a condenser or dephlegmator 27 at the top. The mixture entering rectifier 24 contains, as already stated, substantially no propylene, but it usually contains substantially all of the ethylene, although there are mixtures where it may be desirable to allow a part of the ethylene to go out through valve 37 and then enter column 30 at level 43. The fluid entering rectifier 24 also contains all of the methane, nitrogen and hydrogen and substantial portions of the ethane and acetylene contained in the original mixture. Evaporating coil 67 and condenser-dephlegmator 27 are operated in such a manner that the top effluent leaving rectifier 24 is practically free of ethylene. The bottom product preferably in the vapor state passes outward through valve 68 and pipe 70 and enters the bottom of the tubular system 44 and ascends the outer tubes of that system, being selectively liquefied therein. Liquid draining to the bottom of rectifier 24 may be in like manner conducted to tubular system 44 by manipulation of valve 69. The uncondensed residue of these ascending vapors then passes downward through the inner tubes of tubular system 44, and this fluid liquefied in those tubes is high purity ethylene, whereas the portion of fluid coming in through 70 and condensed in the outer tubes of 44 is a mixture of ethylene and ethane. Both of these liquids are admitted into the main rectifier 30 at the proper levels—the pure ethylene liquid through pipe 95 and valve 96 at the top level, and the ethylene mixed with ethane through pipe 97 and valve 98 at an intermediate level.

Reflux for rectifier 24 is produced by means of dephlegmator 27. Gas whose principal constituent is methane is compressed in compressor 79 to that pressure necessary to condense in coil 67 or to a higher pressure if more refrigerative effect is required for column 24. After passing through suitable aftercoolers, not shown, the compressed methane is cooled in compartment 80 of exchanger 77, and is next liquefied in coil 67. From coil 67 the high pressure liquefied methane is conducted by means of pipe 82 to compartment 83 of exchanger 75 the subcooled liquid methane is conducted through pressure reducing valve 84 and thence to the compartment outside the tubes of dephlegmator 27. The pressure prevailing outside the tubes is that necessary to condense the desired reflux from the vapors rising in column 24. Here the methane liquid is evaporated and produces, by condensation of a portion of the vapor in 27, reflux for rectifier 24. A portion of the reflux produced is removed through pipe 71 and valve 72 to join the liquid around the tubes of 27. This liquid may be just sufficient in amount to constitute make-up for the methane cycle or it may be a larger amount, the balance constituting a high methane product of the rectification.

The vapor from around the tubes of 27 is conducted through pipe 73, and that portion of the vapor constituting the methane cycle is conducted by means of branch pipe 74 to compartment 76 of exchanger 75 and thence to compartment 78 of exchanger 77 wherein its cold is given up to the incoming compressed methane previously described. The low pressure methane is then led to the suction of compressor 79. That portion of the outgoing fluid passing through pipe 73 not diverted through pipe 74 passes outward through pipe 85 and valve 86 directly to compartment 17a of exchanger system 13, thence to compartment 12 of exchanger system 6, and thence to a suitable container or gasholder as the methane product of the method.

By means of the steps described above, savings have been effected relative to prior methods in the power and equipment required to separate ethylene and other constituents from hydrocarbon mixtures. It has been found that by maintaining column 24 under the initial pressure at which the gaseous mixture enters the rectification system, sufficient methane reflux may be condensed in dephlegmator 27 to separate substantially all of the ethylene and higher boiling constituents from the gas leaving tubes 22. In fact, for many gaseous mixtures resulting from cracking operations a sufficient excess of methane over that required for reflux may be condensed in dephlegmator 27 to constitute a considerable methane product if it is desired to do so. Hence, the pressure to which it is necessary or desirable to compress the original gaseous mixture in compressor 2 is only that required to eliminate propylene and higher boiling constituents from the gas stream leaving tubes 22 when these tubes are surrounded by liquid ethane at about atmospheric pressure.

The necessary refrigeration for the method is more economincally maintained by adjusting the pressures of the ethylene and methane leaving compressors 56 and 79 respectively than by initially compressing the gaseous mixtures in compressor 2 to a pressure higher than that necessary for separating the various components. Thus, a large reduction in the pressure to which it is necessary to compress the gaseous mixture in order to separate it into desired constituents has been effected relative to prior art. Pressures as low as 50 lbs. per square inch gage have been realized. A part of the power necessary to compress the cracked gas to its required pressure is recovered by removing from the rectification system the hydrogen together with a portion of the methane under its original pressure, warming it up and expanding it in an expansion motor. Furthermore, by introducing the ethylene and higher boiling components from the base of column 24 and still under the original pressure into vaporizer-condenser 44 a large part of the ethylene reflux necessary to separate the ethylene from the ethane is provided, thus reducing the size of the ethylene cycle.

It is therefore evident that the method provides a simple and efficient means for obtaining ethylene and other constituents from cracked gases in a state of commercial purity.

Throughout the specification, the term gaseous mixture has been used in describing the fluid to be rectified. The fluid to be rectified may be partly in the liquid state without materially changing the nature of the rectification.

Various changes may be made in the details of procedure and in the apparatus employed without departing from the invention or sacrificing any of its advantages.

I claim:

1. The method of recovering ethylene in substantial purity by rectification from a complex gaseous mixture including besides ethylene, propylene, ethane, methane and hydrogen, which comprises separating a portion containing substantially all of the propylene and higher boiling constituents, thereafter separating from the remainder at the same pressure a portion containing substantially all of the methane and other constituents of boiling points lower than that of ethylene and thereafter separating the ethylene from the remaining constituents at a lower pressure.

2. In the method of recovering ethylene from a mixture containing ethylene and constituents of both higher and lower boiling points, the steps which include an initial separation to remove the major portion of the propylene and higher boiling constituents, a second rectification to separate the methane and lower boiling constituents and thereafter subjecting the remainder to a partial separation to produce an ethylene reflux for use in the process.

3. The method of recovering propylene from a gaseous mixture including, among other constituents, hydrocarbons of both higher and lower boiling points, which comprises compressing and cooling the mixture, separating a portion including among other constituents substantially all of the propylene and higher boiling components, rectifying this portion with liquids resulting from the rectification of other constituents of the original mixture, and withdrawing a product containing substantially all of the propylene and practically free from constituents of lower boiling point.

4. The method of recovering propylene from a gaseous mixture including, among other constituents, hydrocarbons of both higher and lower boiling points, which comprises compressing and cooling the mixture, separating a fraction containing substantially all of the propylene and higher boiling constituents together with a portion of the ethane and ethylene, rectifying this fraction at a lower pressure with liquids resulting from the rectification of other portions of the original mixture, recovering the ethylene and ethane as an upper end product of the rectification and recovering the propylene and higher boiling constituents as the lower end product of the rectification.

5. The method of separating and recovering in substantial purity the constituents ethylene and propylene from complex gaseous mixtures containing them, together with percentages of hydrogen, nitrogen, methane, ethane, propane and hydrocarbons of higher boiling point, which comprises dividing the compressed gaseous mixture into two portions, the first of which in the vapor condition contains substantially all the ethylene of the original mixture and only very small quantities of propylene together with constituents of boiling point lower than that of ethylene and the other of which in the liquid state contains substantially all the propylene of the original mixture and only very small percentages of ethylene together with constituents whose boiling points are higher than that of propylene and subsequently recovering the ethylene and propylene separately.

6. The method of separating and recovering in substantial purity the constituent ethylene from complex gaseous mixtures containing it together with percentages of propylene, hydrogen, nitrogen, methane, ethane, propane and hydrocarbons of higher boiling point, which comprises dividing the compressed gaseous mixture into two portions the first of which in the vapor condition contains substantially all the ethylene of the original mixture and only very small quantities of propylene together with constituents of boiling point lower than that of ethylene and the other of which in the liquid state contains substantially all the propylene of the original mixture and only very small percentages of ethylene together with constituents whose boiling points are higher than that of propylene and subsequently recovering the ethylene in substantial purity by partial liquefaction and rectification with only constituents of boiling point lower than that of propylene.

7. The method of separating and recovering in substantial purity the constituent propylene from complex gaseous mixtures containing it, together with percentages of ethylene, hydrogen, nitrogen, methane, ethane, propane and hydrocarbons of higher boiling point, which comprises dividing the compressed gaseous mixture into two portions, the first of which in the vapor condition contains substantially all the ethylene of the original mixture and only very small quantities of propylene together with constituents of boiling point lower than that of ethylene and the other of which in the liquid state contains substantially all the propylene of the original mixture and only very small percentages of ethylene together with constituents whose boiling points are higher than that of propylene, and subsequently recovering from the liquid fraction the propylene in substantial purity by means of partial evaporation and rectification of the resulting vapor and the residual liquid with only constituents whose boiling points are that of ethylene or higher.

8. The method of separating and recovering in substantial purity the constituents ethylene and propylene from complex gaseous mixtures containing them together with percentages of hydrogen, nitrogen, methane, ethane, propane and hydrocarbons of higher boiling point, which comprises dividing the compressed gaseous mixture into two portions the first of which in the vapor condition contains substantially all the ethylene of the original mixture and only very small quantities of propylene together with constituents of boiling point lower than that of ethylene and the other of which in the liquid state contains susbtantially all the propylene of the original mixture and only very small percentages of ethylene together with constituents whose boiling points are higher than that of propylene, recovering the ethylene in substantial purity by partial liquefaction and rectification with only constituents of boiling point lower than that of propylene, and susbequently recovering from the liquid fraction the propylene in substantial purity by means of partial evaporation and rectification of the resulting vapor and the residual liquid with only constituents whose boiling points are higher than that of ethylene.

9. The method of separating and recovering in substantial purity the constituents ethylene and propylene from complex gaseous mixtures containing them, together with percentages of hydrogen, nitrogen, methane, ethane, propane and hydrocarbons of higher boiling point, which comprises dividing the compressed gaseous mixture into two portions, the first of which in the liquid state contains substantially all the propylene of the original mixture and only very small percentages of ethylene, together with constituents whose boiling points are higher than that of propylene, and the other of which in the vapor condition contains susbtantially all the ethylene of the original mixture and only very small quantities of propylene together with constituents of boiling point lower than that of ethylene, recovering the ethylene in substantially pure condition by partial liquefaction and rectification with liquids resulting from this separation and maintained at the original pressure unliquefied constituents such as hydrogen, nitrogen and methane.

10. The method of separating and recovering in susbtantial purity the constituents ethylene and propylene from complex gaseous mixtures containing them, together with percentages of hydrogen, nitrogen, methane, ethane, propane and hydrocarbons of higher boiling point, which comprises dividing the compresed gaseous mixture into two portions, the first of which in the liquid state contains substantially all the propylene of the original mixture and only very small percentages of ethylene, together with constituents whose boiling points are higher than that of propylene, and the other of which in the vapor condition contains susbtantially all the ethylene of the original mixture and only very small quantities of propylene together with constituents of boiling point lower than that of ethylene, recovering the ethylene in susbtantially pure condition by partial liquefaction and rectification with liquids resulting from this separation and maintained at the original pressure unliquefied constituents such as hydrogen, nitrogen and methane, and expanding this unliquefied residue with production of external work in order to recover power.

11. The method of separating ethylene from a mixture including hydrocarbons and hydrogen consisting of a first separation under pressure to obtain a liquid substantially free of ethylene and a gas containing ethylene together with substantially all of the hydrogen and thereafter washing the gas while still under the original pressure with liquid methane to recover the ethylene therefrom.

12. The method of separating ethylene from a mixture including hydrocarbons and hydrogen consisting of a first separation under pressure to obtain a liquid susbtantially free of ethylene and a gas containing ethylene together with substantially all of the hydrogen and thereafter washing the gas while still under the original pressure with liquid methane to recover the ethylene therefrom and subsequently rectifying the resulting ethylene bearing fluids to obtain the ethylene in substantial purity.

13. In a method for the separation of ethylene from mixtures of hydrocarbons and hydrogen the step of subjecting the hydrogen together with its contained ethylene and other constituents resulting from an initial separation of higher boiling constituents to a separate and distinct rectification while still under the initial pressure to recover the ethylene therefrom and returning the ethylene containing fluid resulting from this rectification to the low pressure portion of the main apparatus for further rectification to obtain the ethylene in substantial purity.

14. The method of separating ethylene from a gaseous mixture containing hydrogen and hydrocarbons of both higher and lower boiling points than ethylene, which comprises compressing and cooling the gas, subjecting it to an initial separation one product of which includes the major portion of the propylene together with some ethylene and the other product of which includes all of the hydrogen and the major portion of the ethylene, rectifying these portions separately to obtain high ethylene bearing fluids and thereafter rectifying these fluids to obtain ethylene in susbtantial purity.

JOSEPH L. SCHLITT.